D. BAUGHMAN.
RECEPTACLE CLOSURE.
APPLICATION FILED FEB. 7, 1920.
1,356,754.
Patented Oct. 26, 1920.
2 SHEETS—SHEET 1.
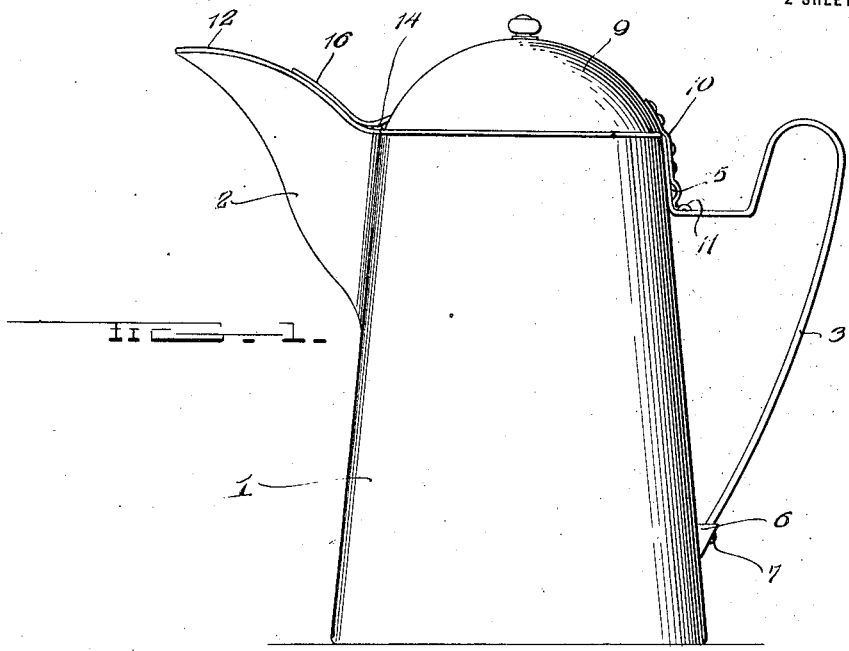
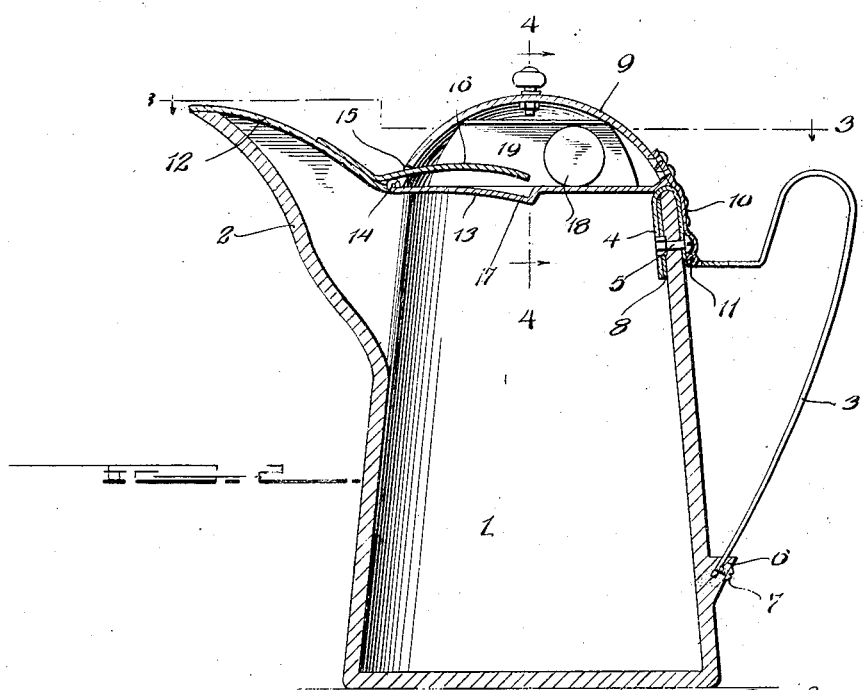
David Baughman
INVENTOR
BY Victor J. Evans
ATTORNEY D. BAUGHMAN.
RECEPTACLE CLOSURE.
APPLICATION FILED FEB. 7, 1920.
1,356,754.
Patented Oct. 26, 1920.
2 SHEETS—SHEET 2.
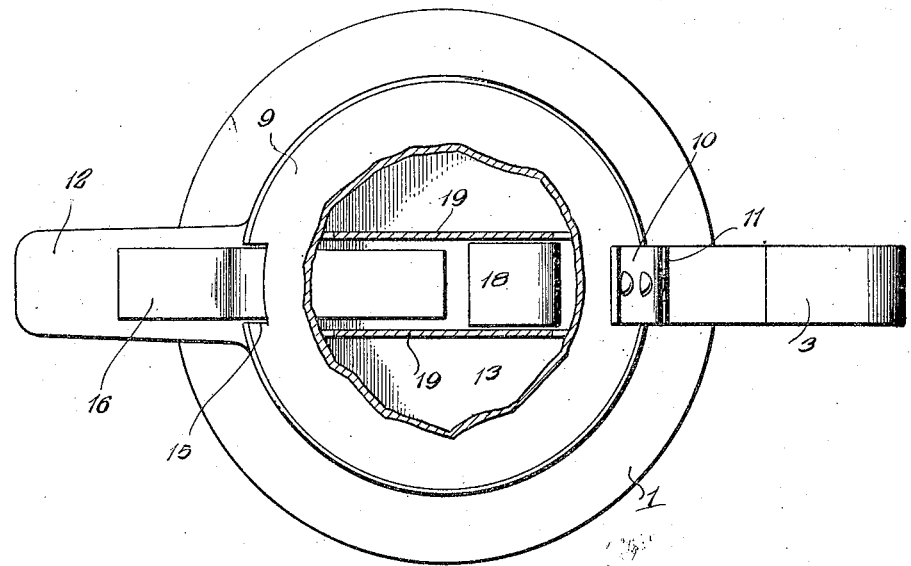
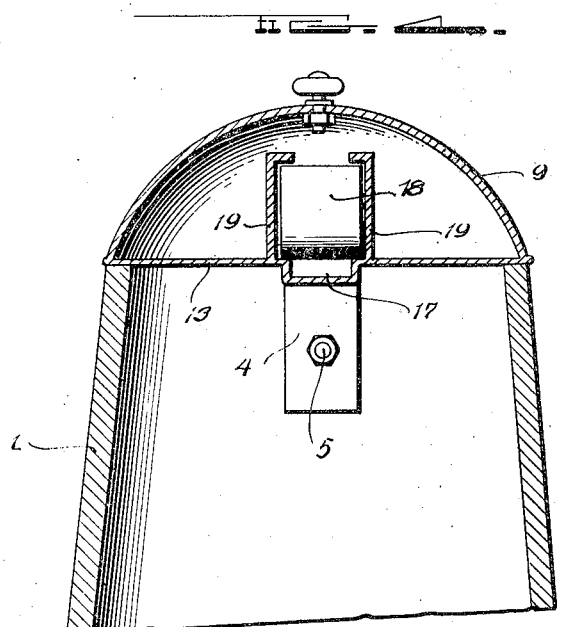
David Baughman
INVENTOR
BY Victor J. Evans
ATTORNEY

UNITED STATES PATENT OFFICE.

DAVID BAUGHMAN, OF ST. PETERSBURG, FLORIDA.

RECEPTACLE-CLOSURE.

1,356,754.  Specification of Letters Patent. Patented Oct. 26, 1920.

Application filed February 7, 1920. Serial No. 356,889.

*To all whom it may concern:*

Be it known that I, DAVID BAUGHMAN, a citizen of the United States, residing at St. Petersburg, in the county of Pinellas and State of Florida, have invented new and useful Improvements in Receptacle-Closures, of which the following is a specification.

This invention relates to a closure for a receptacle or container such as a milk or cream pitcher, coffee pot and the like and the principal object of the invention is to provide a movable weight for opening the spout cover when the receptacle is tilted in the act of pouring the liquid therefrom.

Another object of the invention is to hinge the closure to a handle member and to provide means whereby the handle member may be detachably secured to the receptacle or container so that the said handle and closure may be removed from a broken or worn out container and placed on a new one.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of one form of the invention.

Fig. 2 is a longitudinal sectional view thereof.

Fig. 3 is a section on line 3—3 of Fig. 2.

Fig. 4 is a section on line 4—4 of Fig. 2.

In these views 1 indicates the body of the receptacle or container which may be formed of any suitable or desired material. This receptacle is provided with the pouring spout 2 which has its lip extended above the plane of the top of the receptacle. The handle 3 is detachably secured to the receptacle by having a U-shaped loop 4 formed at its upper end which engages the upper edge of the receptacle and is secured thereto by the bolt 5. The lower end of the handle fits in a slot formed in a projection 6 formed on the lower part of the receptacle and the handle is removably secured in said slot by the screw 7. I may place a strip 8 of suitable packing material under the inner portion of the loop. The cover 9 is of dome shape and has its hinge strap 10 extended to engage the outer part of the loop 4 and this strap is hinged to the handle at the junction of the looped part with the main part, as shown at 11. By this arrangement the cover will remain in closed position while the receptacle is being tilted. The spout lid 12 is hinged to the bottom 13 of the cover, as at 14, and immediately above the hinge the lower part of the cover is provided with a recess 15. A strap 16 has one end secured to the lid 12 and passes through the recess 15 above the hinge 14 and into the cover above the bottom thereof. The inner part of this strap is slightly curved, as shown. The bottom 13 of the cover is provided with a recess 17 to receive this curved part of the strap when the lid 12 is raised and in order to automatically raise the lid when the receptacle is tilted I provide a weight 18, made in the form of a roller and engaging the bottom 13 of the cover and adapted to roll over the inner end of the strap 16 when the receptacle is tilted, thus forcing said strap into the recess 17 and lifting the lid. Guiding strips 19 are located in the cover for said roller and this roller is made of greater length than the width of the recess 17, as shown in Fig. 4, so as to be prevented from entering the recess.

It will thus be seen that as the receptacle is tilted to pour the contents the roller will move toward the front and as it rolls over the inner end of the strap, said strap will be forced into the recess and thus the lid 12 will be lifted. As soon as the receptacle is placed in an upright position the roller will return to its original position due to the curvature of the inner part of the strap 16 and the weight of the lid 12.

It will also be seen that the handle with the cover and lid may be removed from the receptacle and placed on another one so that if one receptacle should become broken it is only necessary to buy a new receptacle. It will also be seen that the cover remains in closed position when the receptacle is tilted due to its hinged point being located an appreciable distance from the top of the receptacle. By having the lip of the spout located above the plane of the top of the receptacle the liquid is prevented from coming in contact with the lid before the lid opens when the receptacle is tilted.

I prefer to form the roller of lead or similar material covered with a layer of brass so as to reduce the wear on said roller.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a receptacle and its spout, a cover for the receptacle having a closed chamber therein, a lid for the spout hinged to the cover, a strap secured to the exterior of the lid and extending within the chamber of the cover, and a weight in said cover adapted to engage said strap when the receptacle is tilted to force the same downwardly and raise the lid.

2. In combination with a receptacle and its spout, a cover for the receptacle having a closed chamber therein, a lid for the spout hinged to the cover, a strap secured to the exterior of the lid and projecting into the chamber of the cover, a track formed in the cover, a roller weight engaging the track and adapted to roll over the strap when the receptacle is tilted to depress the same and raise the lid and guides for said roller.

3. In combination with a receptacle and its spout, a handle member having a loop at its upper end engaging the top of the receptacle, means for securing said loop to the receptacle, a projection on the receptacle having a socket therein, means for detachably securing the lower end of the handle in said socket, a cover hinged to the handle member at the lower part of the outside limb of the loop so that the cover will remain closed when the receptacle is tilted, a lid for the spout hinged to the cover and weighted means carried by the cover and adapted to engage with a part on the lid for raising said lid when the receptacle is tilted.

In testimony whereof I affix my signature.

DAVID BAUGHMAN.